(12) United States Patent
Shaffer et al.

(10) Patent No.: US 7,743,101 B2
(45) Date of Patent: Jun. 22, 2010

(54) TECHNIQUES FOR PROVIDING CALLER ID OF PARTICIPANTS IN A CONFERENCE CALL INVITATION

(75) Inventors: Shmuel Shaffer, Palo Alto, CA (US); Mukul Jain, San Jose, CA (US); Sanjeev Kumar, San Francisco, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 485 days.

(21) Appl. No.: 11/448,276

(22) Filed: Jun. 7, 2006

(65) Prior Publication Data

US 2007/0288562 A1 Dec. 13, 2007

(51) Int. Cl.
*G06F 15/16* (2006.01)
*H04M 3/42* (2006.01)
*H04L 12/16* (2006.01)

(52) U.S. Cl. .................. 709/205; 379/202.01; 370/260

(58) Field of Classification Search ......... 709/204–206; 379/93.21, 202.01–206.01, 207.15; 370/260
See application file for complete search history.

(56) References Cited

U.S. PATENT DOCUMENTS

| | | | | |
|---|---|---|---|---|
| 5,617,539 | A * | 4/1997 | Ludwig et al. | 709/205 |
| 5,701,340 | A * | 12/1997 | Zwick | 379/204.01 |
| 6,839,417 | B2 * | 1/2005 | Weisman et al. | 379/204.01 |
| 7,031,700 | B1 | 4/2006 | Weaver et al. | |
| 7,154,999 | B2 * | 12/2006 | Florkey et al. | 379/142.01 |
| 7,398,294 | B2 * | 7/2008 | Florkey et al. | 709/204 |
| 7,398,295 | B2 * | 7/2008 | Shoroff et al. | 709/204 |
| 7,436,428 | B2 * | 10/2008 | Schrader et al. | 348/14.08 |
| 7,460,508 | B2 * | 12/2008 | Dssouli et al. | 370/338 |
| 7,486,629 | B2 * | 2/2009 | Klaghofer | 370/261 |
| 7,561,537 | B2 * | 7/2009 | Schrader et al. | 370/261 |
| 2002/0078153 | A1 * | 6/2002 | Chung et al. | 709/204 |
| 2003/0081750 | A1 * | 5/2003 | Berstis | 379/202.01 |
| 2003/0215080 | A1 * | 11/2003 | Wengrovitz | 379/219 |
| 2004/0028199 | A1 * | 2/2004 | Carlson | 379/93.21 |
| 2004/0047461 | A1 * | 3/2004 | Weisman et al. | 379/202.01 |
| 2004/0071100 | A1 * | 4/2004 | Klaghofer | 370/261 |

(Continued)

OTHER PUBLICATIONS

J. Rosenberg, et al., "Caller Preferences for the Session Initiation Protocol (SIP) draft-ietf-sip-callerprefs-10", Aquired at: http://tools.ietf.org/html/draft-ietf-sip-callerprefs-10, Oct. 22, 2003, 36 pages.

*Primary Examiner*—Benjamin R Bruckart
*Assistant Examiner*—Benjamin Ailes
(74) *Attorney, Agent, or Firm*—Trellis IP Law Group, PC

(57) ABSTRACT

In one embodiment, techniques for sending a conference invite that provides access to a list of participants in an existing conference are provided. A participant in a conference may decide to send an invite for the existing conference to the user. A request for inviting the user into the existing conference is received. A list of participants in the existing conference is determined. An invite message for the conference is then generated where the invite message includes information for the list of participants. The invite message is then sent to the user where the information for the list of participants is accessible to the user. For example, the list of participants may be displayed as caller ID information when the invite message is received by the user.

25 Claims, 4 Drawing Sheets

U.S. PATENT DOCUMENTS

| | | | |
|---|---|---|---|
| 2004/0137887 A1* | 7/2004 | Niemi | 455/416 |
| 2004/0153497 A1 | 8/2004 | Van Dyke et al. | |
| 2004/0202303 A1* | 10/2004 | Costa-Requena et al. | 379/205.01 |
| 2005/0078612 A1* | 4/2005 | Lang | 370/260 |
| 2005/0174951 A1* | 8/2005 | Schrader et al. | 370/260 |
| 2005/0222890 A1* | 10/2005 | Cheng et al. | 705/9 |
| 2006/0114846 A1* | 6/2006 | Dssouli et al. | 370/261 |
| 2006/0114847 A1* | 6/2006 | Dssouli et al. | 370/261 |
| 2006/0153102 A1* | 7/2006 | Kuure et al. | 370/263 |
| 2006/0177034 A1* | 8/2006 | Reding et al. | 379/211.02 |
| 2007/0109979 A1* | 5/2007 | Fu et al. | 370/261 |
| 2007/0172044 A1* | 7/2007 | Nguyen | 379/202.01 |
| 2007/0172045 A1* | 7/2007 | Nguyen et al. | 379/202.01 |
| 2007/0253545 A1* | 11/2007 | Chatterjee et al. | 379/211.02 |

* cited by examiner

TECHNIQUES FOR PROVIDING CALLER ID OF PARTICIPANTS IN A CONFERENCE CALL INVITATION

BACKGROUND OF THE INVENTION

Embodiments of the present invention generally relate to telecommunications and more specifically to techniques for providing a list of participants in a conference call invite message.

A conference call may be attended by a number of participants. During the conference call, the need to conference in another user may arise. In this case, one of the participants may decide to conference the user in. For example, the participant may place the conference call on hold and out-dial the user's number.

Caller ID may be used to identify the calling party. For example, when the user receives the participant's call, caller ID may display identifying information for the participant that is calling. In one example, if Mike is calling Joe, the caller ID of "Mike" and possibly Mike's phone number may be displayed on Joe's caller ID. Based on the caller ID, Joe may decide to let his voicemail system answer the call. For example, Mike may be a junior member of the team and Joe may decide that he wants to call Mike back. Accordingly, Joe is not contacted to join in the conference call. Thus, any issues that the participants wanted to discuss with Joe are typically skipped or not discussed in detail. This limits the effectiveness of the conference call.

DETAILED DESCRIPTION OF EMBODIMENTS OF THE INVENTION

Embodiments of the present invention provide techniques for sending a conference call invite that provides access to a list of participants in an existing conference. A participant in a conference may decide to send an invite for the existing conference to the user. A request for inviting the user into the existing conference is received. A list of participants in the existing conference is determined. An invite message for the conference is then generated where the invite message includes information for the list of participants. The invite message is then sent to the user where the information for the list of participants is accessible to the user. For example, the list of participants may be displayed as caller ID information when the invite message is received by the user.

Figure 1:
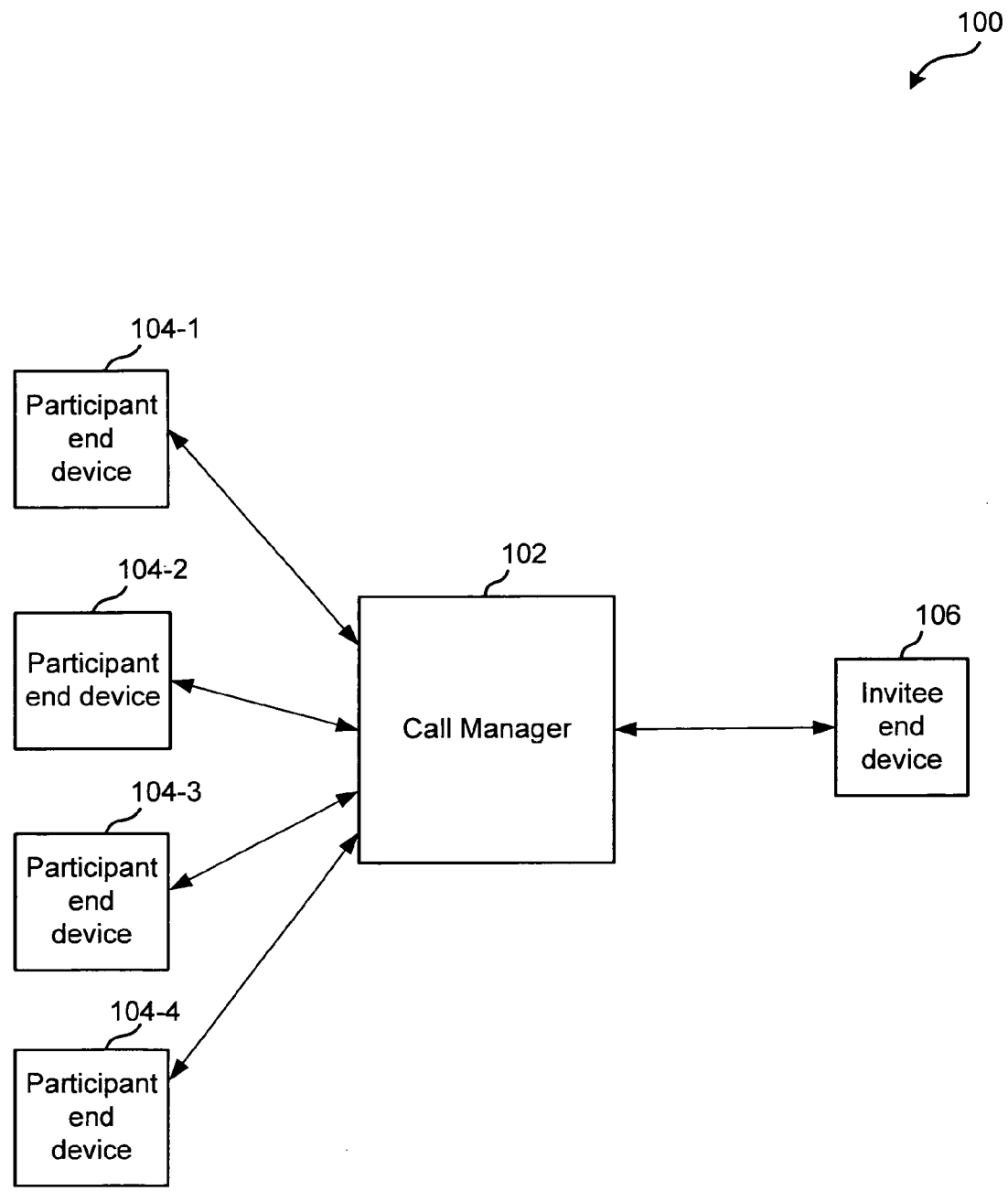
FIG. 1 depicts a system for sending a conference invite according to one embodiment of the present invention.

FIG. 1 depicts a system 100 for sending a conference invite according to one embodiment of the present invention. As shown, system 100 includes a call manager 102, one or more participant end devices 104, and an invitee end device 106.

Participant end devices 104 may be participating in a conference. A conference may be two or more users that are communicating via media exchange. For example, end devices 104-1-104-4 may be participating in a voice conference call. In this voice conference call, users are connected through a voice modality.

A modality refers to a mode of communication. A voice modality refers to any mechanism for transferring voice information and may include systems such as a plain old telephone service network (POTS), a cellular network, a voice-over IP network, etc. Other modalities may also be appreciated, such as an instant message modality, video modality, e-mail modality, etc. It will be understood that embodiments of the present invention may be used with any modality. Thus, for example, the conference may be an instant messaging conference, video conference, etc. Also, multiple modalities may be used in a conference, such as phone and video modalities may be used in a conference.

Participant end devices 104 may include any devices used by a user to participate in the conference. For example, participant end devices 104 may include any communications device, such as a cellular phone, POTS telephone, a voice client on a computer (e.g., a voice-enabled IM client, an Internet-enabled VoIP device, a soft phone, a video conferencing end device, an instant messaging client, etc.

Call manager 102 is configured to provide the conference in one embodiment. For example, call manager 102 provides the bridging between participant end devices 104 to allow media to be transferred in the conference. A person skilled in the art will appreciate how a conference is provided.

Embodiments of the present invention allow a participant to invite an invitee into a conference. When the invitee is invited, information for a list of participants in the existing conference may be provided in an invite message sent to the invitee. For example, a list of participants may be displayed as caller ID information in one embodiment. Also, in other embodiments, the list of participants may be accessed by the invitee. For example, the list of participants may be sent in envelope information. The invitee may then use an interactive menu to access the information for the list of participants.

In one embodiment, a participant end device 104-1 sends an invite request to call manager 102. For example, a participant may perform an ad hoc request for a conference. In this case, the participant may put the conference on hold. Then the participant dials (e.g., using a PSTN line) the invitee's number. In one embodiment, the participant selects a conference call option. In this case, the invite message is sent with information indicating that this is a conference call invite.

Call manager 102 then determines which conference the request is for and determines a list of participants in the existing conference. Call manager 102 generates an invite message that indicates it is from the participant. The invite message also includes information for the list of participants that was determined for the existing conference. The information for the list of participants may be any information associated with the participants. For example, the information may be the participants' names, phone numbers, usernames, or any other identifying information. In one embodiment, the information for the list of participants may be included in envelope information or caller ID information for the invite message.

The information for the list of participants may be in any form. For example, the list of participants may be text-based and include a list of participant names. Also, a video clip or snapshot may be included in the message. For example, if a video-conference is being provided, a video clip from the video-conference with the participants in it may be included in the message as the list of participants. Also, snapshots of the participants may also be included.

When the invite message is received, invitee end device 106 can access the list of participants. For example, the list of participants is displayed in caller ID information when the invite message is received. Invitee end device 106 or any other device may render the list of participants in a display. In one embodiment, the caller ID field of end device 106 may display the list of participants. An example of the information displayed may be "participant A on behalf of a conference with participants B, C, and D". Other methods of rendering the list of participants may include playing a video clip, audio clip, etc. For example, the video clip of the participants may be played.

Accordingly, the invitee can decide whether to answer the call using the information provided in the invite message. The invitee knows that the call is being received for a conference. Additionally, the invitee knows the participants that are participating in the conference. Thus, an informed decision as to whether the invite message should be answered can be made. In this embodiment, the invitee is not an existing participant in the conference but still can access the list of participants.

If the invitee wants to be conferenced into the conference, the call may be answered and call manager 102 may conference invitee end device 106 into the conference. Also, call manager 102 may transfer the call to a device that can conference invitee end device 106 into the conference, such as a bridge.

Figure 2:
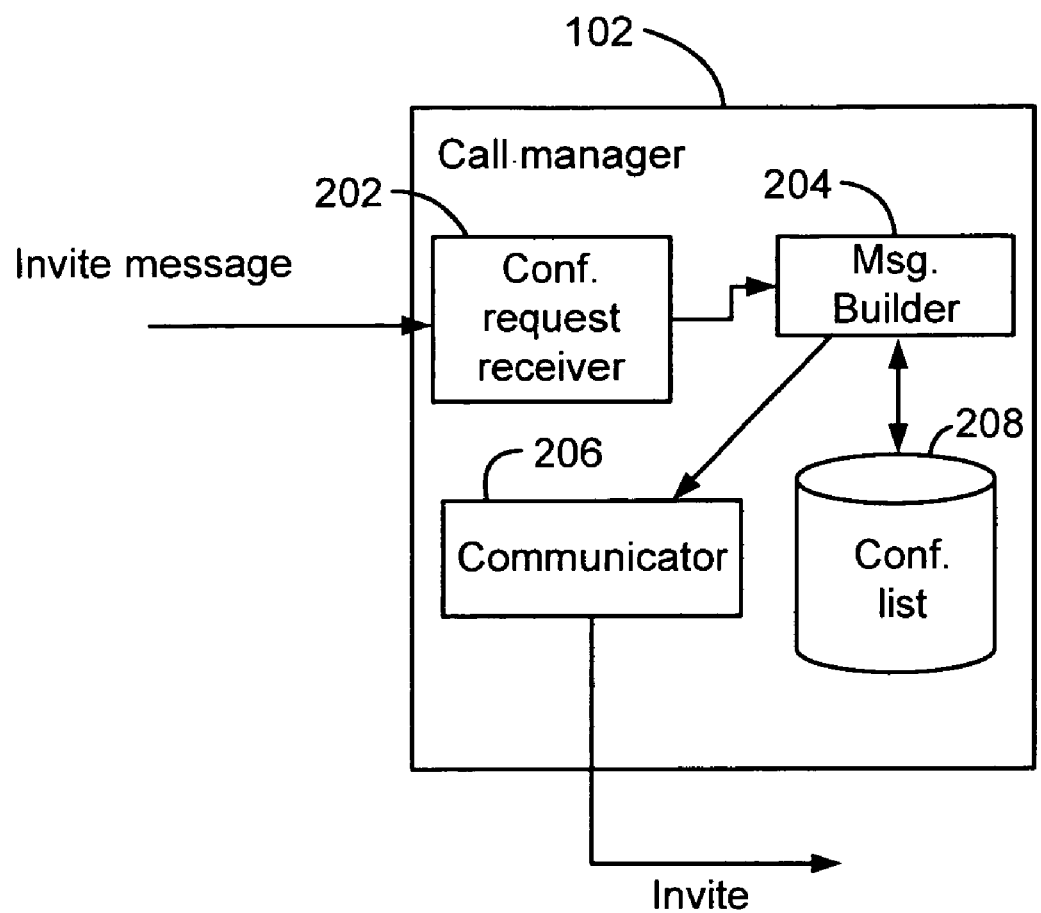
FIG. 2 depicts an embodiment of a call manager according to embodiments of the present invention.

FIG. 2 depicts a more detailed embodiment of call manager 102 according to one embodiment of the present invention. As shown, call manager 102 includes a conference request receiver 202, a message builder 204, and a communicator 206. It will be understood that variations of call manager 102 may be appreciated.

Conference request receiver 202 is configured to receive the invite message from participant end device 104-1. Conference request receiver 202 may determine if the conference call option has been selected by a participant. If the conference call option has been selected, then conference request receiver 202 sends the invite message to message builder 204.

Message builder 204 is then configured to determine which participants are participating in the conference. For example, information may be included in the invite message identifying a conference. Message builder 204 may determine which participants are participating in the conference from storage 208. For example, a conference ID or session ID may be used to retrieve a roster of participants in the conference. In other embodiments, message builder 204 may communicate with other systems, such as a conferencing system, to determine the list of participants. Also, other methods for determining the list of participants may also be appreciated. For example, the list of participants may be sent with the initial invite message from end device 104-1. Also, a list of participant IDs may be sent and message builder 204 is configured to determine usernames for the IDs. Message builder 204 may look up the usernames and add them as the list of participants.

Message builder 204 may also prompt participants to determine if they desire their names to be released in the list of participants. For example, conference request receiver 202 may message with each participant end device 104-1-104-4 to determine if he/she wants their name to be included in the list of participants. Accordingly, it may be possible that not all participants participating in the existing conference will be included in the list of participants. This may also be true even if the participants are not prompted. For example, preferences may be set such that certain participants are not included in a list of participants automatically.

Communicator 206 receives the generated message with the list of participants and is configured to send the message to invitee end device 106. In one embodiment, communicator 206 is configured to send a message through a plurality of modalities.

Communicator 206 may determine which modality may be the best modality to send the message to the invitee. For example, if presence information indicates the invitee is active on an instant messaging modality, communicator 206 may decide to send the invite message through the instant message modality. Presence may be stored in storage 208 for the invitee. Communicator 206 determines which modality the invitee is active based on information in storage 208. Then, a message may be sent to the invitee through one or more of the modalities on which he/she is active. For example, an instant message and a phone call may be sent inviting the invitee into the conference. Both invites may include the list of participants.

Communicator 206 may also set information in the message such that the message receives a certain priority. For example, if an invitee has rules that filter messages from a certain user, communicator 206 may set information that overrides the rules. Thus, the invite message for the conference is approved and forwarded to invitee end device 106 even if the user is not on an approved list of users that are permitted to contact the invitee.

Communicator 206 may include the list of participants in the message in different ways. For example, the list of participants may be included in the caller ID field of the message. Also, the list of participants may be included in envelope information. Either way, the list of participants is accessible to the invitee when the invite message is received. For example, if the information is included in the caller ID field, the list of participants may be automatically rendered as caller ID information when the message is received. If the information is included in the envelope information, the invitee may choose to retrieve the list of participants from the envelope information.

Figure 3:
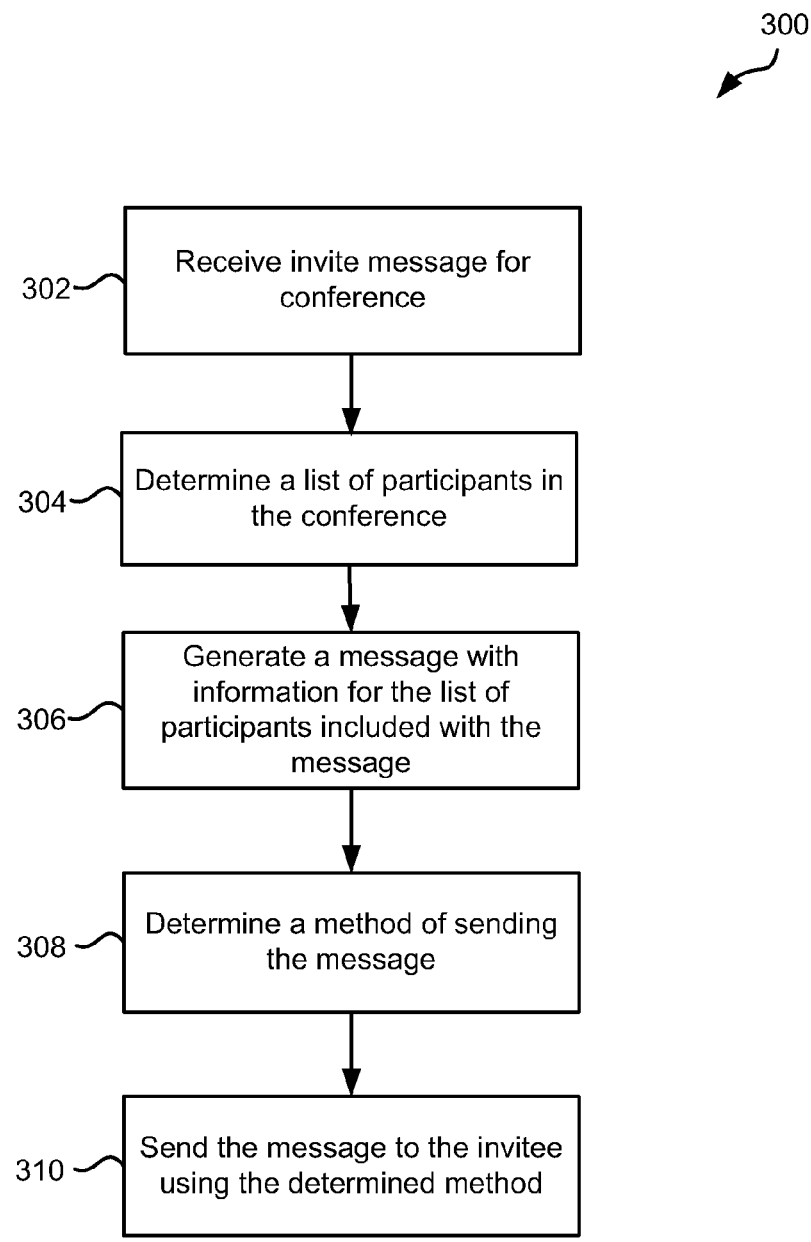
FIG. 3 depicts a simplified flow chart of a method for sending an invite message for a conference according to one embodiment of the present invention.

FIG. 3 depicts a simplified flow chart 300 of a method for sending an invite message for a conference according to one embodiment of the present invention. Step 302 receives an invite request for an invitee. The invite request is for an existing conference and indicates as such.

Step 304 determines participants in the conference. A list of participants is then generated.

Step 306 generates a message with information for the list of participants included with the message. The list may be included as caller ID information or as envelope information.

Step 308 determines a method of sending the message. For example, a modality to send the message may be determined. After the method is determined, step 310 sends the message to the invitee using the determined method. The invitee can then access the list of participants and the message also indicates that this is an invite for a conference with the list of participants.

Figure 4:
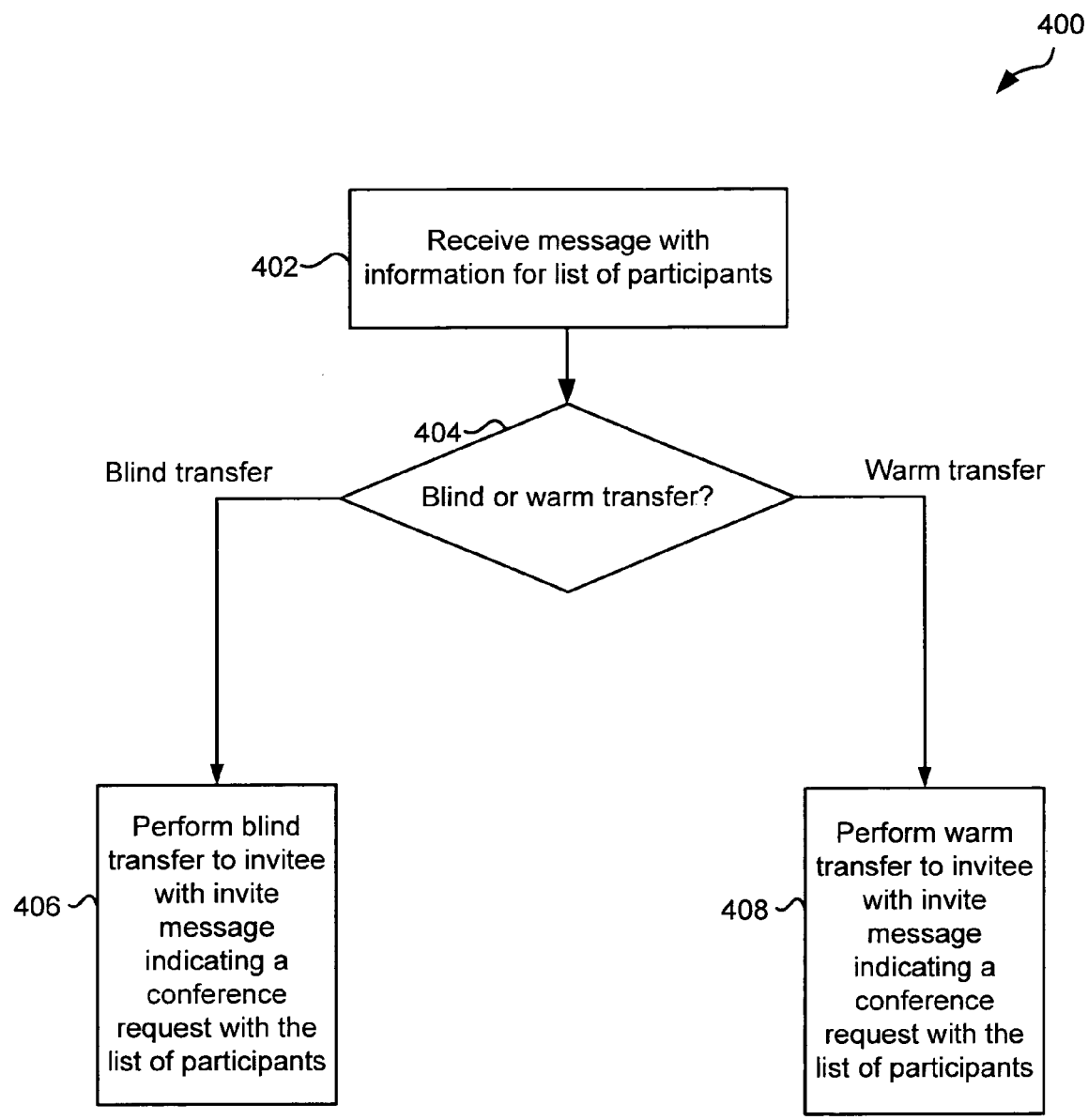
FIG. 4 depicts a simplified flow chart of a method for receiving an invite request for a conference according to one embodiment of the present invention.

FIG. 4 depicts a simplified flow chart 400 of a method for receiving an invite request for a conference according to one embodiment of the present invention. In some cases, a user may have his/her calls answered by an attendant. Embodiments of the present invention may still be used in this case.

Step 402 receives a message with information for the list of participants. The message is an invite for a conference and may be received at a party that needs to transfer the call to the invitee. For example, the invitee may have their calls answered by an attendant. The attendant then needs to transfer the call to the invitee.

In one embodiment, the transfer may be a blind transfer (also referred to as an unattended transfer) or a warm transfer (also reference to as a consult or attended transfer). The blind transfer is a transfer directly to the invitee. The warm transfer is where the call is put on hold and the attendee calls the invitee. The attendant and the invitee may exchange a few words and then the attendant conferences the caller, him/herself, and the invitee into the conference. A short time after that, the attendant drops out of the call leaving the caller and the invitee in the greater conference call. Although the different types of attendant transfers are provided, it will be recognized that embodiments of the present invention are not limited to attendant transfers and can be provided as described above without the attendant, such as using an attended (ad-hoc) conference invite.

Step 404 determines if a blind or warm transfer is provided. In step 406, if a blind transfer is provided, the participant is transferred and the message is sent. For example, the message may state that this is a conference invite from the attendant for the participant with the list of participants. An example message may be "Conference invite from attendant X for Participant A for a conference with B, C, and D".

If the transfer is a warm transfer, in step 408, the attendant puts the call on hold and calls the invitee. A message may indicate that this is a conference call invite from the attendant for participant 104-1 with the list of participants shown. When the invitee answers the call, the attendant may ask the invitee if he/she would like to join the conference. The invitee may be conferenced in as described above after talking with the attendant.

Embodiments of the present invention provide many advantages. For example, an invitee is informed the call is coming from an individual on behalf of a conference. A list of participants is provided such that an invitee can make an intelligent decision as to whether to answer the call or not.

In one example, participants 104 are in a conference call. One of the participants may use a participant end device 104 to place an ad hoc conference call. In this case, the participant may place the conference call on hold and out-dial an invitee end device 106 in an ad hoc manner.

Call manager 102 may be a PBX system that receives the ad hoc conference call request. The private branch exchange (PBX) system may determine the list of participants in the conference. A list of participants is then automatically included in a call to the invitee as caller ID information. The call is then sent to the invitee end device 106. The PBX system may be a time division multiplex (TDM) voice switch as well as a central or distributed voice over IP (VoIP) multimedia communication system.

Invitee end device 106 then may automatically display the caller ID information. In this case, a list of participants is included in the caller ID information and displayed for the invitee. For example, the caller ID information may state "participant A calling on behalf of a conference with participants B, C, and D" in the caller ID information field. Accordingly, an ad hoc transfer is used to provide the list of participants and an indication that the call is for a conference in a PBX environment.

In another example, participants may be participating in an instant message chat or conference. When another user is desired, the user may be selected from a buddy list or manually entered. An instant message chat invite for the chat is then sent. This invite not only states it is an invite to join a chat, it also identifies the participants in the chat. For example, the invite may be "Bob is inviting you into a chat with Susan, Robert, and Kyle."

Although the invention has been described with respect to specific embodiments thereof, these embodiments are merely illustrative, and not restrictive of the invention. It will be recognized that embodiments of the present invention may be used in any modality. Although voice may be discussed, other modalities may be appreciated. Also, a PBX system may include any telecommunications system, such as a TDM voice switch, VoIP multimedia system, etc.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for sending a conference invite, the method comprising:

receiving an ad-hoc request to invite a user into an existing conference, the existing conference being established and including one or more participants participating in the existing conference;

putting, by a private branch exchange (PBX), the existing conference on hold in response to receiving the ad-hoc request;

determining, by the PBX, a list of the one or more participants that are participating in the existing conference on hold, wherein the list is determined by considering whether each of the one or more participants in the existing conference desires their identification information to be included in the list for release;

generating, by the PBX, an invite message for the existing conference, the invite message including information for the list of the one or more participants;

sending the invite message to the user, wherein the information for the list of the one or more participants is accessible to the user;

wherein sending the invite message comprises determining a modality in a plurality of modalities associated with the user; and sending the invite message in the determined modality; and wherein determining the modality comprises determining a modality where the user is listed as having an active presence.

2. The method of claim 1, wherein the information for the list of the one or more participants is included as caller ID information.

3. The method of claim 2, wherein the information for the list of the one or more participants is configured such that it is renderable as caller ID information when the invite message is received at a user device.

4. The method of claim 1, wherein the invite message is sent using the PBX, the PBX including the information for the list of the one or more participants in the invite message using a caller ID feature.

5. The method of claim 1, wherein the invite message is sent using an instant message modality, video modality, phone modality, or email modality.

6. The method of claim 1, wherein the information for the list of the one or more participants is included in envelope information for the invite message, wherein the information for the list of the one or more participants is accessible upon a request from the user.

7. The method of claim 1, wherein the information for the list of the one or more participants is configured to be rendered as a video clip, audio clip, text, or a picture.

8. The method of claim 1, wherein the information for the list of the one or more participants comprises identification information for the list of the one or more participants.

9. The method of claim 1, wherein the invite message is configured to be transferred using a warm, blind or separate transfer, wherein the information for the list of the one or more participants is sent with the transferred invite message.

10. The method of claim 1, wherein the list of the one or more participants is a subset of participants actually participating in the existing conference.

11. The method of claim 1, wherein the invite message is sent using a public switched telephone network (PSTN) line.

12. A method for processing invite messages for a conference, the method comprising:

receiving, from a private branch exchange (PBX), an invite message inviting a user into an existing conference that has been put on hold using an ad-hoc request, the existing conference being established and including one or more participants participating in the existing conference, the invite message including information for a list of the one or more participants for the existing conference, wherein the list is determined by considering whether each of the one or more participants in the existing conference desires their identification information to be included in the list for release;

determining, from the invite message, the information for the list of the one or more participants participating in the existing conference; and rendering the information for the list of the one or more participants determining a modality in a plurality of modalities associated with the user; and sending the invite message in the determined modality; and wherein determining the modality comprises determining a modality where the user is listed as having an active presence.

13. The method of claim 12, wherein rendering the information comprises displaying the information as caller ID information.

14. The method of claim 12, wherein the information for the list of the one or more participants is included as envelope information, the method further comprising:

receiving a request for the list of the one or more participants, wherein rendering the information comprises rendering the information for the list of the one or more participants upon receiving the request.

15. A non-transitory computer-readable storage medium configured to send a conference invite, the computer-readable storage medium comprising:

logic configured to receive an ad-hoc request to invite a user into an existing conference, the existing conference being established and including one or more participants participating in the existing conference;

logic configured to put, by a private branch exchange (PBX), the existing conference on hold in response to receiving the ad-hoc request;

logic configured to determine, by the PBX, a list of the one or more participants that are participating in the existing conference on hold, wherein the list is determined by considering whether each of the one or more participants in the existing conference desires their identification information to be included in the list for release;

logic configured to generate, by the PBX, an invite message for the existing conference, the invite message including information for the list of the one or more participants;

logic configured to send the invite message to the user, wherein the information for the list of the one or more participants is accessible to the user;

wherein the logic configured to send the invite message comprises determining a modality in a plurality of modalities associated with the user; and sending the invite message in the determined modality; and wherein determining the modality comprises determining a modality where the user is listed as having an active presence.

16. The computer-readable storage medium of claim 15, wherein the information for the list of the one or more participants is included as caller ID information.

17. The computer-readable storage medium of claim 16, wherein the information for the list of the one or more participants is configured such that it is renderable as caller ID information when the invite message is received at a user device.

18. The computer-readable storage medium of claim 15, wherein the computer-readable storage medium is included in the PBX system, the PBX system configured to include the information for the list of the one or more participants in the invite message using a caller ID feature.

19. The computer-readable storage medium of claim 15, wherein the logic is configured to send the invite message using an instant message modality, video modality, phone modality, or email modality.

20. The computer-readable storage medium of claim 15, wherein the information for the list of the one or more participants is included in envelope information for the invite message, wherein the information for the list of the one or more participants is accessible upon a request from the user.

21. The computer-readable storage medium of claim 15, wherein the information for the list of the one or more participants is configured to be rendered as a video clip, audio clip, text, or a picture.

22. The computer-readable storage medium of claim 15, wherein the information for the list of the one or more participants comprises identification information for the list of the participants.

23. The computer-readable storage medium of claim 15, wherein the invite message is configured to be transferred using a warm, blind or separate transfer, wherein the information for the list of the one or more participants is sent with the transferred invite message.

24. The computer-readable storage medium of claim 15, wherein the list of the one or more participants is a subset of participants actually participating in the existing conference.

25. An apparatus configured to send a conference invite, the apparatus comprising:

one or more computer processors; and logic encoded in one or more non-transitory computer-readable storage media for execution by the one or more computer processors and when executed operable to:

receive an ad-hoc request to invite a user into an existing conference, the existing conference being established and including one or more participants participating in the existing conference;

put, by a private branch exchange (PBX), the existing conference on hold in response to receiving the ad-hoc request;

determine, by the PBX, a list of the one or more participants that are participating in the existing conference on hold, wherein the list is determined by considering whether each of the one or more participants in the existing conference desires their identification information to be included in the list for release;

generate, by the PBX, an invite message for the existing conference, the invite message including information for the list of the one or more participants;

send the invite message to the user, wherein the information for the list of the one or more participants is accessible to the user;

wherein sending the invite message comprises determining a modality in a plurality of modalities associated with the user; and sending the invite message in the determined modality; and wherein determining the modality comprises determining a modality where the user is listed as having an active presence.

* * * * *